United States Patent
Hahn

(10) Patent No.: US 9,235,587 B2
(45) Date of Patent: Jan. 12, 2016

(54) SYSTEM AND METHOD FOR SELECTIVELY ROUTING CACHED OBJECTS

(71) Applicant: Judah G. Hahn, Ofra (IL)

(72) Inventor: Judah G. Hahn, Ofra (IL)

(73) Assignee: SanDisk Technologies Inc., Plano, TX (US)

( * ) Notice: Subject to any disclaimer, the term of this patent is extended or adjusted under 35 U.S.C. 154(b) by 455 days.

(21) Appl. No.: 13/803,721

(22) Filed: Mar. 14, 2013

(65) Prior Publication Data

US 2014/0188791 A1 Jul. 3, 2014

Related U.S. Application Data

(60) Provisional application No. 61/747,547, filed on Dec. 31, 2012.

(51) Int. Cl.
*G06F 17/30* (2006.01)

(52) U.S. Cl.
CPC .................. *G06F 17/30132* (2013.01)

(58) Field of Classification Search
USPC ........................................................ 707/610
See application file for complete search history.

(56) References Cited

U.S. PATENT DOCUMENTS

| 7,716,187 | B2 | 5/2010 | Teodosiu et al. | |
|---|---|---|---|---|
| 2002/0143798 | A1 | 10/2002 | Lisiecki et al. | |
| 2007/0073638 | A1 | 3/2007 | McVeigh et al. | |
| 2008/0155214 | A1 | 6/2008 | Shitomi | |
| 2012/0254555 | A1* | 10/2012 | Miwa et al. | 711/154 |
| 2012/0303905 | A1* | 11/2012 | Zhang et al. | 711/136 |

FOREIGN PATENT DOCUMENTS

WO WO 2011/059979 5/2011

OTHER PUBLICATIONS

International Search Report and Written Opinion for International Application No. PCT/US2013/075399 dated Sep. 12, 2014 (8 pages).

* cited by examiner

*Primary Examiner* — Amresh Singh
(74) *Attorney, Agent, or Firm* — Brinks Gilson & Lione

(57) ABSTRACT

A monitoring application and method for using a monitoring application are disclosed. The monitoring application is configured to manage file system objects in a memory device layer (including copying of the file system objects) and is configured to manage one or more data structures to enable the management of the file system objects to be transparent to the application layer and/or the operating system layer.

26 Claims, 10 Drawing Sheets

ORIGINAL PLACEMENT OF FILE "Z"
ON DRIVE C:

ACCESSING FILE "Z" ON DRIVE C:\

COPYING OF FILE "Z" TO DRIVE Y:

ACCESSING FILE "Z" FROM DRIVE Y: AFTER COPYING

SYSTEM AND METHOD FOR SELECTIVELY ROUTING CACHED OBJECTS

REFERENCE TO RELATED APPLICATION

This application claims the benefit of U.S. Provisional Application No. 61/747,547, filed Dec. 31, 2012, the entirety of which is hereby incorporated by reference herein.

TECHNICAL FIELD

This application relates generally to managing data in a system. More specifically, this application relates to selectively routing cached objects in the system.

BACKGROUND

FIG. 1 illustrates a host system 100 that includes an application 105, a kernel I/O manager 110, file systems 120, 122, and device drivers 130, 132, and illustrates multiple memory components 138 (shown as drive C: 134 and drive Y: 136). In operation, when the application 105 seeks access to file "Z", the application sends a request to kernel I/O manager 110 for a handle to file "Z". In response, the kernel I/O manager 110, acting as the interface between the application and memory devices, resolves the path to file "Z" in order to obtain the handle, and sends the handle to the application.

The arrows in FIG. 1 illustrate the logical path of communication amongst the different parts of the system, in which the application 105 sends the request to the kernel I/O manager 110, and in which the kernel I/O manager 110 resolves the path by examining the root directory 140, which includes information on the path to file "Z".

As shown in FIG. 1, the system includes multiple memory devices, such as in the form of drive C: 134 and drive Y: 136. Applications, such as application 105, written above the operating system layer are typically unaware of optimized partitions that may be available for their use, and thus write files to predefined locations without regard to the properties of the location to which they are writing. For example, many operating systems define application-specific data directories, and applications will write all of their data to these directories. The use of temporary files is similarly defined in most operating systems, and applications will simply use filenames and locations defined by the operating system interface for this purpose. This may lead to suboptimal use of a multi-partition layout. Complicating this is the use of external storage, which may offer performance and capacity improvements.

However, the kernel file systems and the application stacks can be modified in order to manually select which partition or mount point should be used in each case, thereby enabling improved performance. For example, applications may explicitly address external storage, either by user configuration (i.e., the user selecting a directory to save files to) or through code in the application that detects and uses external storage.

BRIEF SUMMARY

A system for and a method of routing a file system object from a first memory device to a second memory device transparent to an operating system resolving a path to the file system object is provided.

In one aspect, a method is provided for selectively routing a file system object transparently to an operating system. The method includes: performing by a processor configured to carry out selective routing under control of a monitoring application which is operable with an operating system and includes an intermediate partition with redirect information, wherein the processor has operable connections to first and second memory devices for such selective routing: determining whether to route a file system object from the first memory device to the second memory device; in response to determining to route the file system object, causing the file system object to be routed to a location in the second memory device; and updating the intermediate partition's redirect information for the file system object with the location of the file system object in the second memory device, wherein the first memory device includes a directory for the operating system to resolve paths for file system objects stored in the first memory device, wherein the directory includes information of a redirect to the intermediate partition, and wherein, using the intermediate partition's redirect information, the operating system continues using the directory in the first memory device to resolve the path to the file system object stored in the second memory device so that the routing of the file system object to the second memory device is transparent to the operating system.

The first memory device may include a directory associated therewith for the operating system to resolve paths for file system objects stored in the first memory device, with the directory including an intermediate partition redirect indicative of a redirect to the intermediate partition. In this regard, using the intermediate partition redirect, the operating system continues using the directory in the first memory device to resolve the path to the file system object stored in the second memory device so that the copying of the file system object to the second memory device is transparent to the operating system.

The intermediate partition may dynamically change based on the routing (e.g., copying) of the file from the first memory device to the second memory device, while the directory for the operating system to resolve paths for file system objects stored in the first memory device need not change. For example, prior to copying the file system object, the directory may include the intermediate partition redirect redirecting to the intermediate partition. In this regard, prior to copying, the operating system accesses the directory, is redirected to the intermediate partition, and in turn redirected again to the file system object stored in the first memory device.

The first memory device and the second memory device may differ in one or more aspects, such as location, speed, size, endurance, or performance. The second memory device may be a cache so that copying the file system object into the second memory device increases the speed of access to the file system object.

In another aspect, a monitoring device is provided for selectively routing a file system object transparently to an operating system. The monitoring device includes: one or more memories configured to store an intermediate partition, the intermediate partition comprising redirect information; and a processor in communication with the one or more memories. The processor is configured to carry out selective routing under control of the monitoring device which is operable with the operating system, wherein the processor has operable connections to first and second memory devices for such selective routing and configured to: determine whether to route a file system object from the first memory device to the second memory device; in response to determining to route the file system object, cause the file system object to be routed to a location in the second memory device; and update the intermediate partition's redirect information for the file system object with the location of the file system object in the second memory device, wherein the first memory device includes a directory for the operating system to resolve paths for file system objects stored in the first memory device, wherein the directory includes information of a redirect to the intermediate partition, and wherein, using the intermediate partition's redirect information, the operating system continues using the directory in the first memory device to resolve the path to the file system object stored in the second memory device so that the routing of the file system object to the second memory device is transparent to the operating system.

The first memory device includes a directory for the operating system to resolve paths for file system objects stored in the first memory device, with the directory including an intermediate partition redirect indicative of a redirect to the intermediate partition. In this regard, using the intermediate partition redirect, the operating system continues using the directory in the first memory device to resolve the path to the file system object stored in the second memory device so that the routing of the file system object to the second memory device is transparent to the operating system.

Other features and advantages will become apparent upon review of the following drawings, detailed description and claims. Additionally, other embodiments are disclosed, and each of the embodiments can be used alone or together in combination. The embodiments will now be described with reference to the attached drawings.

BRIEF DESCRIPTION OF THE DRAWINGS

The system may be better understood with reference to the following drawings and description. In the figures, like reference numerals designate corresponding parts throughout the different views.

DETAILED DESCRIPTION

Figure 2:
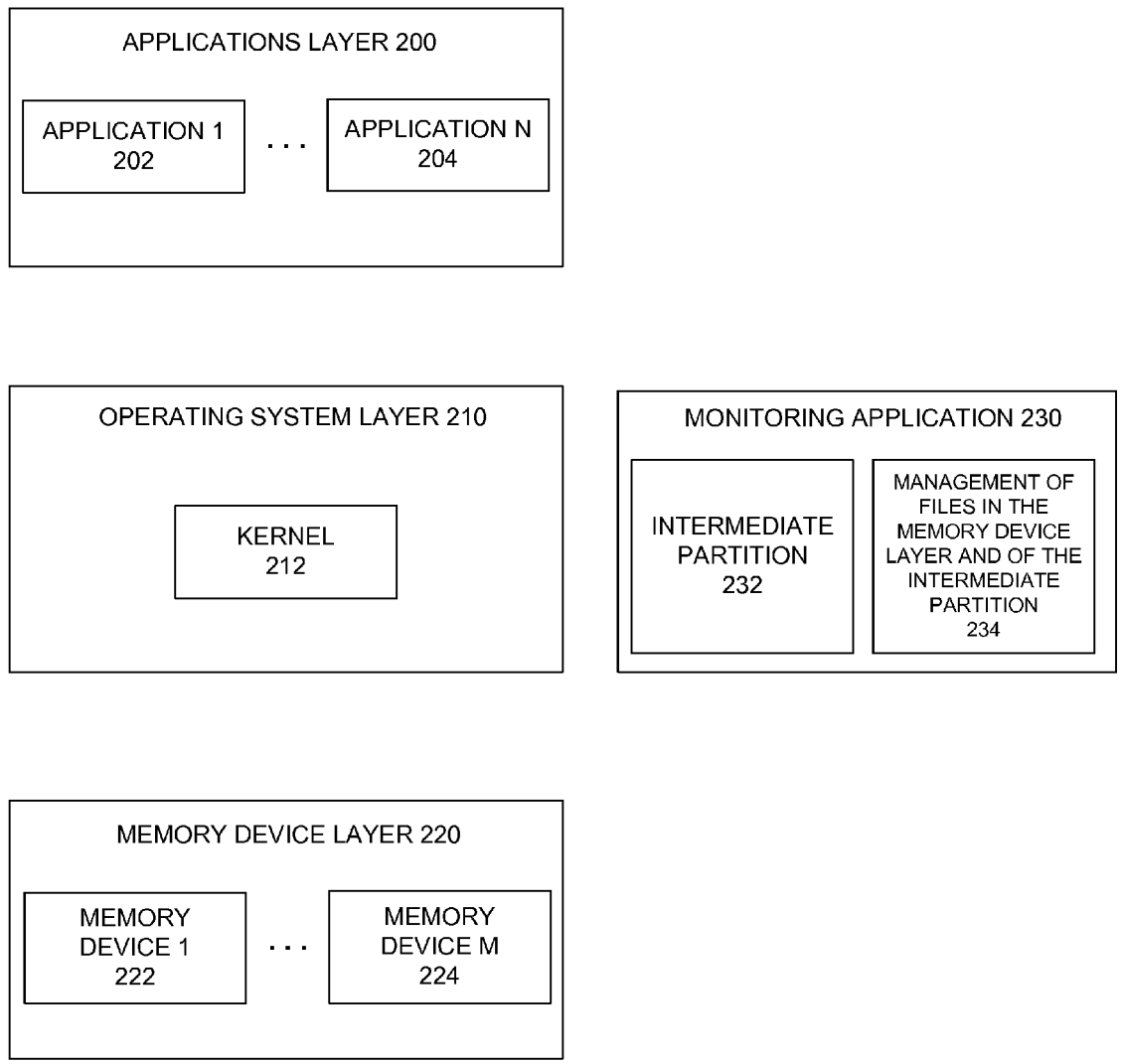
FIG. 2 illustrates the different layers in a system, including the application layer, operating system layer, and the memory device layer, and a monitoring application that may operate within the system.

FIG. 2 illustrates the different layers in a system, including the application layer 200, the operating system layer 210, the memory device layer 220, and a monitoring application 230 that may operate within the system. The application layer 200 includes one or more applications. As illustrated in FIG. 2, the application layer includes application 1 202 to application N 204. The operating system layer 210 includes kernel 212.

Kernel 212 functions as a part of the operating system that, generally speaking, provides a layer between the hardware (such as the memory devices in the memory device layer 220) and the application programs running in the application layer 200.

Kernel 212 makes its services available to the applications that run on the system via requests. One of the requests relates to access of data on the memory devices, such as open( ) close( ) read( ) and write( ) requests. In response to a request, kernel 212 acts as the interface between the application and the hardware, provides hardware abstraction so that the applications do not need to know the specifics to address the hardware, and provides file system abstraction so that the application can open a file without knowing the specific structure of the file system. For example, in response to the request, the kernel may resolve the path to the hardware, and send a representation of the path (such as in the form of a handle) to the application so that the application may communicate with a memory device in the memory device layer. In this way, the application need not know the details in addressing the hardware, instead relying on the kernel to resolve the details of addressing.

As shown in FIG. 2, the system may include a memory device layer 220, which generally represents one or more memory devices in the system. Memory device layer 220 may include multiple memory devices, such as memory device 1 222 to memory device M 224. For example, one memory device may be a hard disk drive and another memory device may be a removable memory storage device. The hard disk drive may have one set of rules to optimize caching of data. Whereas, the removable NAND flash memory storage device may have a different set of rules to optimize caching of data based on certain read/write patterns. So that, different physical partitions may be employed in the memory devices that have different attributes, optimized for the specific type of data being used as well as its endurance, error correction, and performance requirements.

FIG. 2 further illustrates monitoring application 230. Monitoring application 230 may include two portions: (1) software configured to manage file system objects in the memory device layer (including movement (e.g., copying) of the file system objects (an example of which is management of files in memory device layer and of the intermediate partition software 234, discussed below); and (2) one or more data structures to enable the management of the file system objects to be transparent to the application layer 200 and/or the operating system layer 210 (an example of which is intermediate partition 232, as discussed below). Monitoring application 230 determines where to place the file system objects, and using the one or more data structures, results in at least one additional redirect in the process of resolving the path of a file, as discussed in FIGS. 3A-3D. In this regard, the monitoring application 230 is a supplement to the directory structure with the monitoring application 230 referencing the directory structure. So that, monitoring application 230 acts as a virtual layer that is separate from and in addition to the applications layer 200 and the operating system layer 210.

The virtual layer may be dynamically changed in order to reflect the movement of the file system objects. In one embodiment, one or more directories associated with the memory devices and used to resolve the path to the file system objects do not change in response to movement of the file system objects. For example, a file system object may be stored in drive C:, as discussed with regard to FIGS. 3A-3D. A directory associated with drive C: may be used in order to resolve the path to file system objects stored in drive C:. As discussed below, the directory (such as the root directory) includes a redirect to the virtual layer (such as a redirect to the intermediate partition in the virtual layer). In one embodiment, the monitoring application 230 writes to the directory (such as the root directory) so that the directory includes the redirect to the virtual layer. In this regard, when the file system object is copied from drive C: to drive Y:, the directory (such as the root directory) associated with drive C: used to resolve paths does not change (e.g., the root directory includes the redirect to the intermediate partition both before and after copying the file system object to drive Y:). The virtual layer (such as the intermediate partition) is dynamically changed by the monitoring application 230 to reflect the copying of the file system object to drive Y:. As discussed in more detail below, the monitoring application 230 may modify a part of the virtual layer (e.g., the intermediate partition) to reflect the copying of the system file object to drive Y:. In operation, prior to copying of the file system object to drive Y:, the operating system layer (such as kernel 212) accesses the directory (such as the root directory) to resolve the path to the file system object, is redirected to the virtual layer, which results in another redirect back to the drive C:. Likewise, in operation after copying the file system object to drive Y:, the operating system layer accesses the directory to resolve the path to the file system object, is redirected to the virtual layer, which results in a redirect to the drive Y:. In this way, the copying of the file system object is transparent to the operating system layer. For example, the operating system layer does not need to be specifically notified of the movement of the file system object to drive Y:. Rather, because of the redirect to the virtual layer in the directory associated with drive C: and because of the dynamic modification of the virtual layer to direct to the new copy of the file system object, the operating system layer is able to resolve the path to the copy of the file system object in drive Y:.

Figure 1:
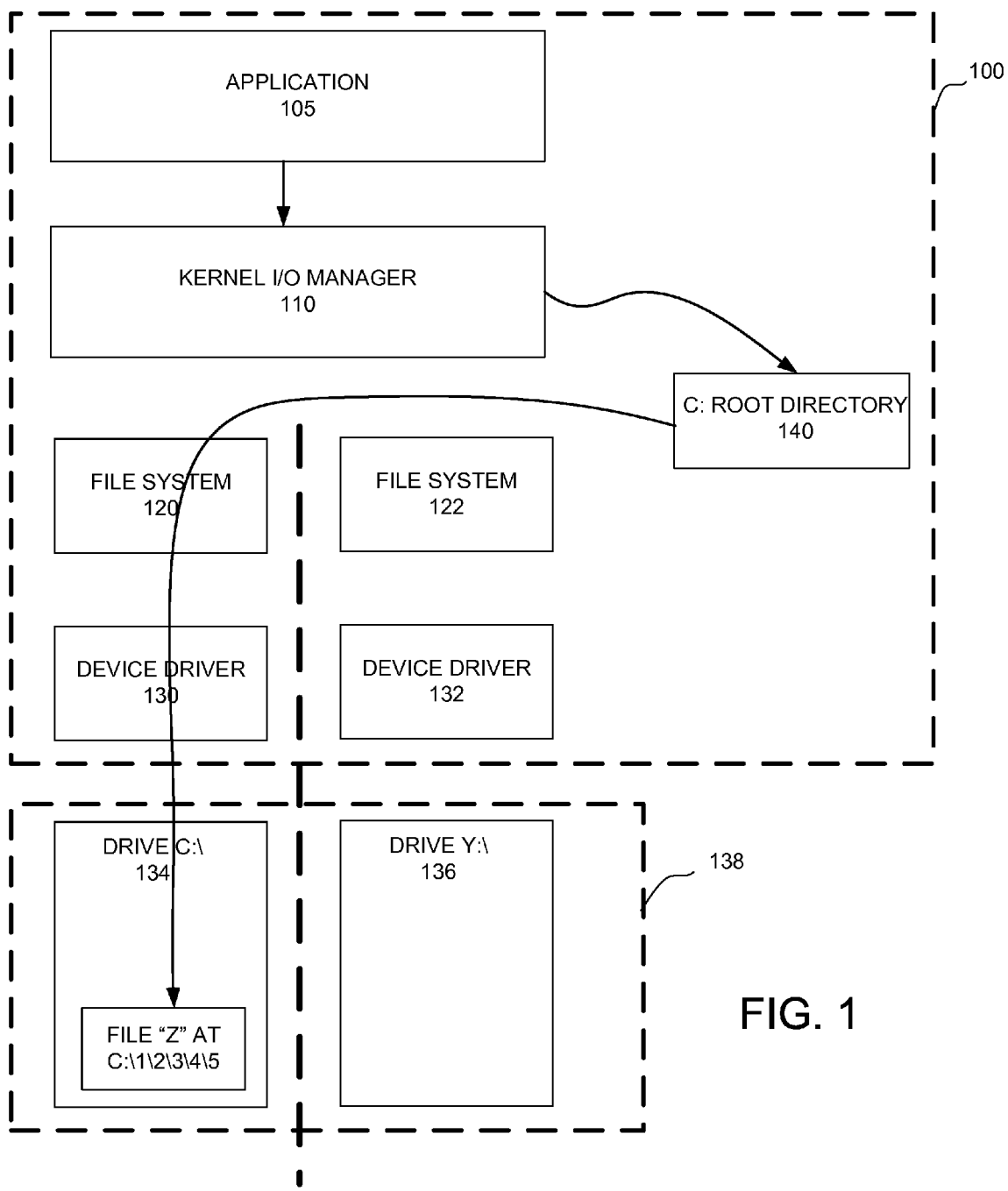
FIG. 1 illustrates a prior art system in which the kernel I/O manager resolves the path to file "Z".

In an alternate embodiment, one or more directories associated with the memory devices and used to resolve the path to the file system objects change in response to movement of the file system objects. More specifically, the directory (such as the root directory) and the virtual layer (such as the intermediate partition) may be modified to reflect the copying of the file system object. For example, a file system object may be stored in drive C. The directory (such as the root directory) associated with drive C: may be used in order to resolve the path to file system objects stored in drive C:. Prior to copying the file system object from drive C: to drive Y:, the directory does not include a redirect to the intermediate partition. Rather, the directory includes an indication of the path to the file system object stored on drive C:, such as illustrated in FIG. 1. After copying of the file system object from drive C: to drive Y:, the directory (such as the root directory) for drive C: and the virtual layer (such as the intermediate partition) are both dynamically changed to reflect the copying of the file system object to drive Y:. For example, the directory (such as the root directory) for drive C: is changed to indicate a redirect to the virtual layer (such as a redirect to the intermediate partition). Further, the virtual layer is modified to reflect another redirect to the location in drive Y: where the file system object was copied. In operation, prior to copying of the file system object to drive Y:, the operating system layer (such as kernel 212) accesses the directory (such as the root directory) to resolve the path to the file system object. Likewise, in operation after copying the file system object to drive Y:, the operating system layer still accesses the directory associated with drive C: to resolve the path to the file system object, is redirected to the virtual layer, which results in a redirect to the drive Y:. Again, the copying of the file system object is transparent to the operating system layer. For example, the operating system layer does not need to be specifically notified of the movement of the file system object to drive Y:. Rather, because the operating system uses the directory (such as the root directory) associated with drive C:, and because of dynamic modification of the redirect to the virtual layer in the directory associated with drive C: and the dynamic modification of the virtual layer to direct to the new copy of the file system object, the operating system layer is able to resolve the path to the copy of the file system object in drive Y:.

In this regard, because of this additional virtual layer in the system, the application layer 200 and/or the operating system layer 210 need not be modified in the event that the monitoring application 230 moves file system objects within the system. More specifically, the monitoring application 230 may manage the file system objects in the memory device layer to determine whether, when, and/or where to move a file system object. The determination whether, when, and/or where to move the file system object amongst the different memory devices in the memory device layer 220 may depend on one or more criteria, such as, for example, the use of the file system objects within the system and/or the characteristics of the memory devices within the system.

Memory devices within the memory device layer 220 may be the same, or may differ from one another. When different, the memory devices may differ in one or more aspects. Examples of differing aspects include, but are not limited to: location (e.g., whether the memory device is considered remote or local to another computing device within the system); speed; size (e.g., directory size); endurance; performance; application-specific information (such as database and application cache locations); controller-specific information exchanged between the monitor application and the storage controller firmware; etc.

For example, the speed of the memory devices within the system may vary. More specifically, a first memory device may be slower in terms of responding to a read, write and/or erase request for a file system object than a second memory device. In particular, the first memory device may comprise a hard disk drive whereas the second memory device may comprise cache. So that, the speed of the first memory device is slower than the second memory device. As discussed in more detail below, the monitoring application may determine to move (such as make a copy of) the file system object to another memory device within the system. The determination to move the file system object may be based, for example, on one or more factors, such as the speed of the memory devices within the system (e.g., the memory device that currently stores the file system object and the memory device that will receive the copy of the file system object) and the frequency of access to the file system object.

Though the example of differing speeds of the memory devices is discussed below, any differing aspect between the memory devices may be the basis for the monitoring application to move the file system object amongst the differing memory devices. As another example, two memory devices in the system may both be local to another computing device within the system, but the memory devices may differ in that one memory device has larger memory capacity and is slower than another memory device. The examples provided are merely for illustration purposes. Other bases to determine whether, when and/or where to move the file system object are contemplated.

When the monitoring application 230 determines to move a file system object, the monitoring application 230 updates one or more data structures in the system. The one or more data structures may be used by the application layer 200 and/or the operating system layer 210 in order to access the moved data structures (such as resulting in at least one additional redirect when resolving the path to the file system object). As discussed in more detail below, the data structure(s) may be arranged in one of several ways. For example, the data structures may include an existing data structure (such as a data structure used to resolve the path to a file, one example of which is the mounting point of the memory device) and a data structure associated with the monitoring application 230 (such as intermediate partition 232). More specifically, the file system may modify the data structure used to resolve the path to a file. For example, the mounting point (one example of which is a root directory) may be modified to point to the intermediate partition. The modification of the mounting point may be performed once (such as when installing the monitoring application 230), may be performed upon boot-up of the system, and/or may be performed when a new memory device is installed in the system. Further, the monitoring application 230 may modify the intermediate partition 232 in response to moving a file system object within the system.

Referring back to FIG. 2, monitoring application 230 includes intermediate partition 232 and management of files in memory device layer and of the intermediate partition software 234. The management of files in memory device layer and of the intermediate partition software 234 is configured to: (1) determine whether, when, and/or where to move a file system object; and (2) manage the intermediate partition. Management of the file system objects in the system may be based on one or more criteria, as discussed above. A file system object may include any piece of information available to the application layer 200 and/or the file system layer 210. One specific example of a file system object includes a file, which is a self-contained piece of information available to the application layer 200 and/or the file system layer 210.

The depiction of the monitoring application 230, and its component parts, is merely for illustration purposes only. For example, though FIG. 2 illustrates management of files in memory device layer and of the intermediate partition software 234 as a single software entity, the logic included in management of files in memory device layer and of the intermediate partition software 234 may be divided amongst different modules. Further, the logic in management of files in memory device layer and of the intermediate partition software 234 may be in a single computing device or may be divided amongst different computing devices within the system. In addition, monitoring application 230, including intermediate partition 232 and management of files in memory device layer and of the intermediate partition software 234, may be stored in one of several places in the system. For example, the monitoring application 230 may be stored on the same computing device as the devices in the applications layer 200 and/or the operating system layer 230. More specifically, the monitoring application 230 may be stored on a host computing device. In an alternate embodiment, the intermediate partition 232 may be stored on a computing device that is different from the computing device that stores management of files in memory device layer and of the intermediate partition software 234.

As another example, the intermediate partition 232 may exist as a temporary file system that is hosted by the management of files in memory device layer and of the intermediate partition software 234 via a technology such as FUSE or a specialized kernel driver, depending on operating system. Alternatively, the intermediate partition 232 may be a physical partition or a directory in an existing partition accessible to calling applications.

As discussed above, the intermediate partition 232 comprises one or more data structures to enable the different layer(s) in the system (such as the application layer 200 and/or the operating system layer 210) to access the moved file system object without changing the logic or firmware of the different layer(s) in the system. More specifically, the applications in the application layer 200 and/or the kernel 212 in the operating system layer 210 may use the intermediate partition 232 (and further may use the mounting point of the memory device(s)) to resolve the path to the moved file system object, as discussed in more detail below. In this way, the movement of the file system object is transparent to the applications in the application layer 200 and the kernel 212 in the operating system layer 210 so that the software in either layer need not be modified.

Figure 3A:
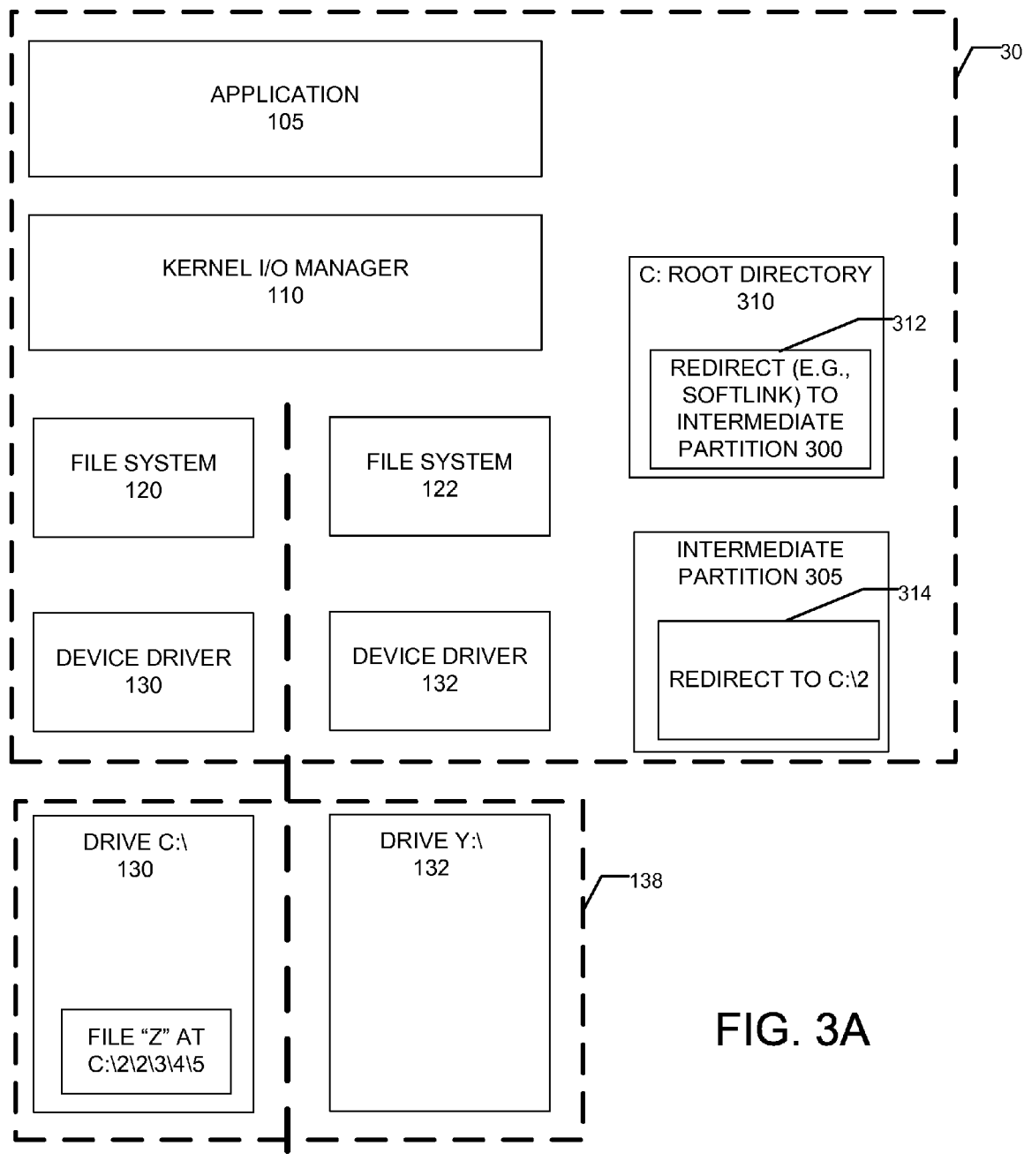
FIG. 3A illustrates a system including application, a kernel I/O manager, root directory, intermediate partition, multiple file systems, multiple device drivers, drive C: and drive Y:.

FIGS. 3A-D illustrate a sequence of operations for the system, with changes to the storage of a file, and changes to the intermediate partition. FIG. 3A illustrates a host system 300 that includes application 105, a kernel I/O manager 110, root directory 310, intermediate partition 305, multiple file systems 120, 122, and multiple device drivers 130, 132. FIG. 3A further illustrates multiple memory components 138, shown as drive C: 134 and drive Y: 136. FIG. 3A further illustrates that file "Z" is stored on drive C:. FIG. 3A is merely one example of a division between a host system and multiple memory components. In an alternate embodiment, part or all of the multiple memory components (such as drive C: 130) may be included in the host system. Further, the designation of the host system 300 is merely for illustrative purposes. Fewer, greater or different components may be included in the host system.

Operating systems may use one or more data structures in order to resolve the path to access a file on the memory device. One example of a data structure is the mount point of the memory device, which may be used to resolve the path to access a file on the memory device. A specific example of the mount point is a root directory. Alternatively, the data structure to resolve the path to access a file on the memory device may be different from the root directory. A directory (e.g., a subdirectory), separate from the root directory, may be used, as described in illustration 1 below.

The root directory may take different forms depending on the operating system. In Windows-type operating systems, the root directory for each storage device and partition (e.g., logically independent section) of a hard disk drive (HDD), and they are labeled, for example, Y: for the removable flash memory device, C: for the first partition of the HDD, D: for the second partition of the HDD, etc. Unix-type operating systems use a single root directory for all of the memory devices on the system, in which the directory at the top of the file system is designated by a forward slash (/). Further, Unix-type operating systems include a first-tier of directories within the root directory, such as /bin, /usr, /etc, /misc.

Root directory 310 is an example of the mount point for drive C:. As shown in FIG. 3A, the root directory 310 includes redirect 312. The redirect 312 is configured to act to redirect the resolution of the path to another part of the system. For example, when kernel I/O manager 110 is resolving the path to a file in the system, the redirect acts to redirect the resolution from the root directory to the intermediate partition 305. One example of redirect 312 is a softlink. A softlink (also called a symbolic link) is a special type of file or directory entry that contains a reference to another file or directory in the form of an absolute or relative path and that affects pathname resolution. In this way, the softlink can be used as a pointer or indirection to another file. The operating system automatically dereferences this pointer when an application asks for a file, thus abstracting the location of the file from the application. Softlinks are available in most file systems, including the ext4 file system used in Android®, discussed below. Further, a softlink may point to another softlink.

In this way, the root directory is modified so that, in one embodiment, the portion of the root directory used to resolve the path for files on the respective drive is replaced to consist entirely of redirects (such as softlinks) to a different part of the system (such as to the intermediate partition 305).

Figure 3B:
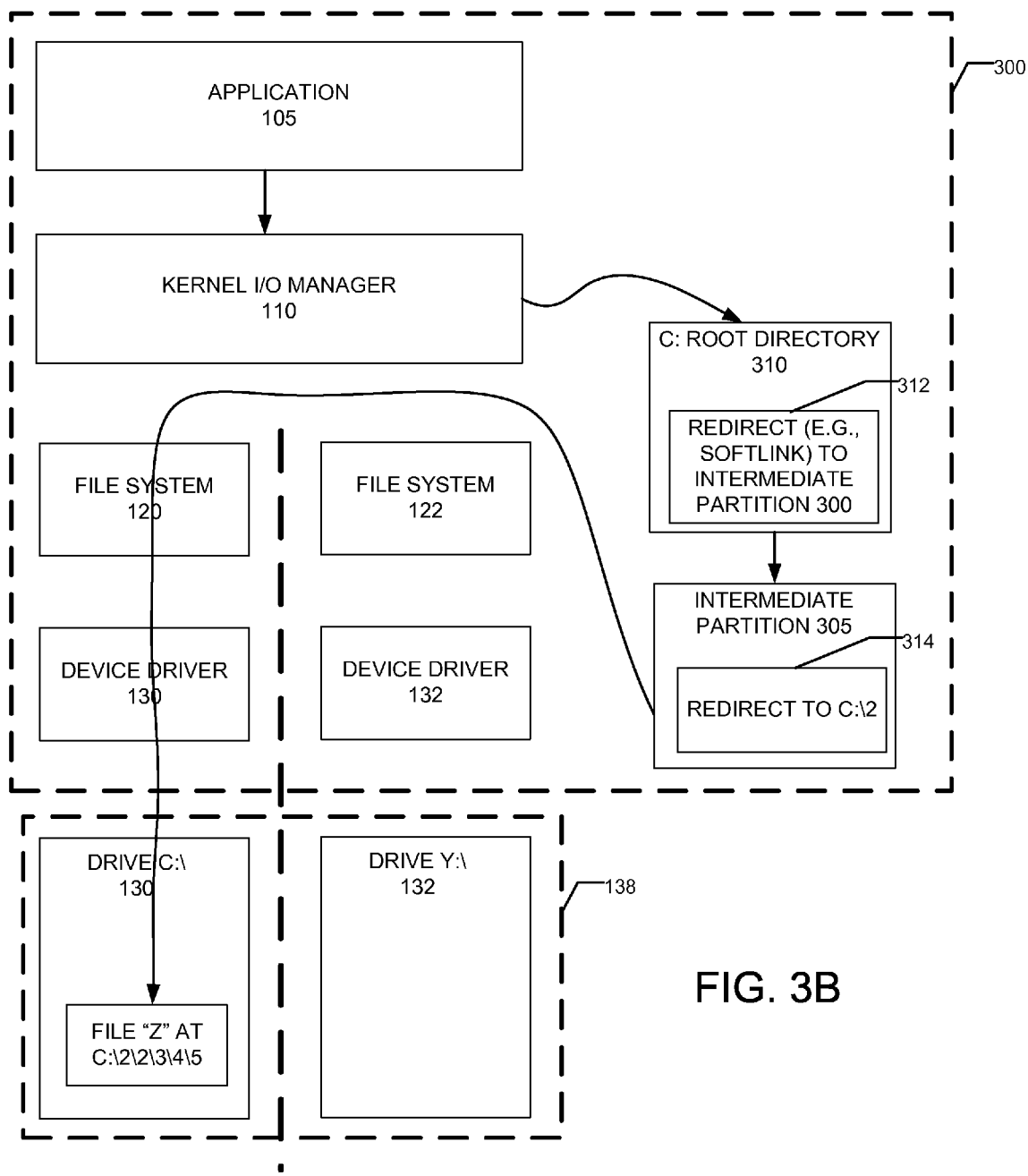
FIG. 3B illustrates the kernel I/O manager using the root directory and the intermediate partition to resolve the path to file "Z" on drive C:.

FIG. 3B illustrates one example of the kernel I/O manager 110 using the root directory 310 and the intermediate partition 305 to resolve the path to file "Z" on drive C:. FIGS. 3A-D are merely an illustration. Each operating system implements its respective logic for parsing symbolic links, and therefore may deviate from this depiction. The arrows in FIGS. 3B and 3D illustrate the logical path of communication amongst the different parts of the system in resolving the path of file "Z". The specific communications of the kernel I/O manager 110 in resolving the path are discussed below with respect to FIG. 6. As shown in FIG. 3B, the kernel I/O manager 110 receives a request from application 105 for the handle to file "Z". The request includes, for example, a string in the form of C:\1\2\3\4\52. The kernel I/O manager 110 reads the C:\1 in the string and accesses the root directory 310 in the C: drive to resolve the path to file "Z". Because the root directory 310 has been modified with a redirect, the kernel manager changes the path of the string. For example, the redirect may indicate X:\7, which is pointing to the intermediate partition. So that, kernel I/O manager 110 substitutes C:\1 with X:\7 to modify the string to X:\7\2\3\4\52. Using the modified string, the kernel I/O manager 110 communicates with intermediate partition 305. Intermediate partition includes another redirect (e.g., another softlink) back to a part on the C: drive (in this instance C:\2) so that the kernel I/O manager 110 finally resolves the path to file "Z" on the C: drive. So that, even though file "Z" is stored on the C: drive, the C: drive root directory redirects the kernel I/O manager 110 away from the root directory, only to be redirected to another part of the C: drive.

Figure 3C:
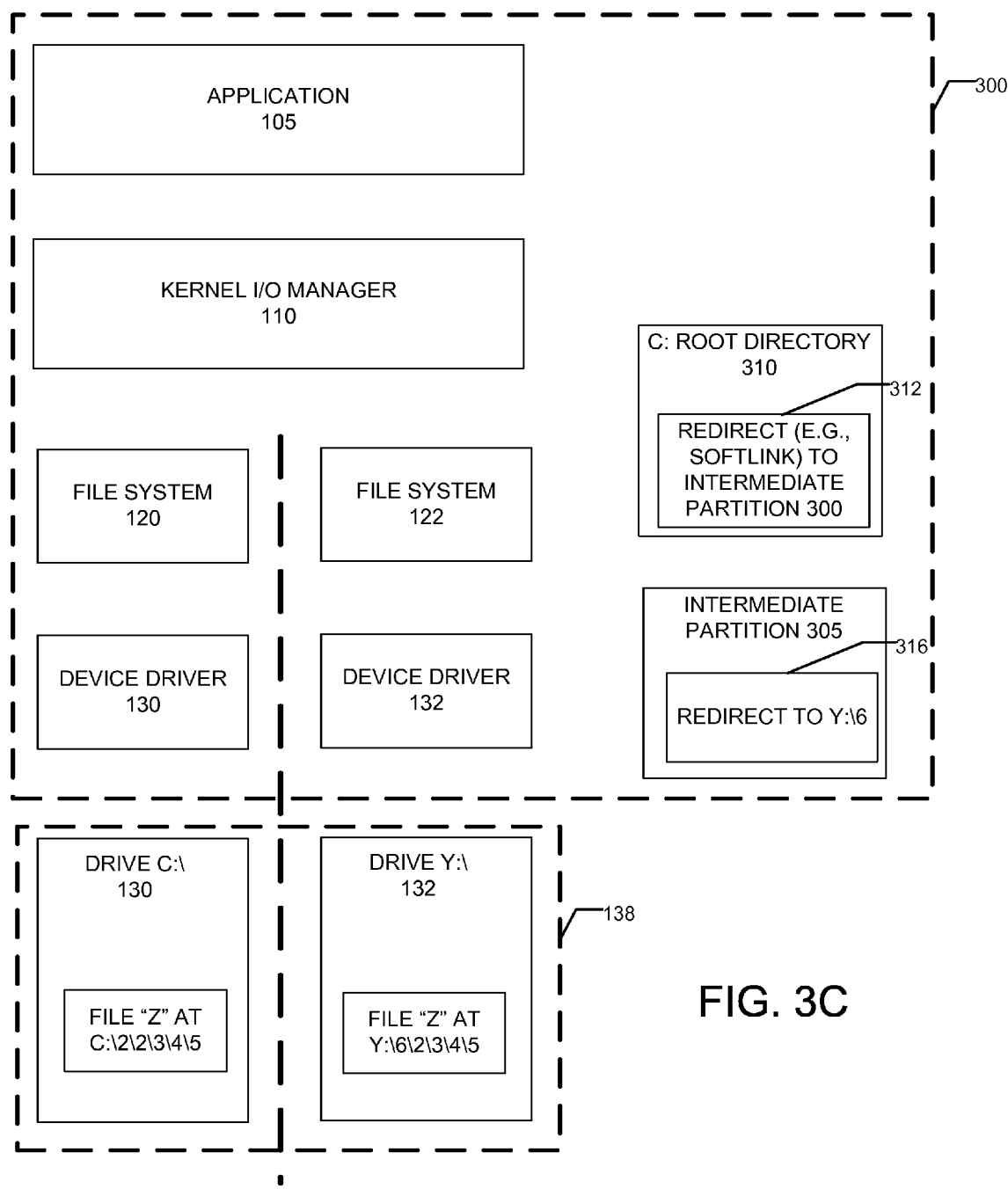
FIG. 3C illustrates the copying of file "Z" to drive Y:, and the change to the intermediate partition to reflect the copying of file "Z" to drive Y:.
Figure 3D:
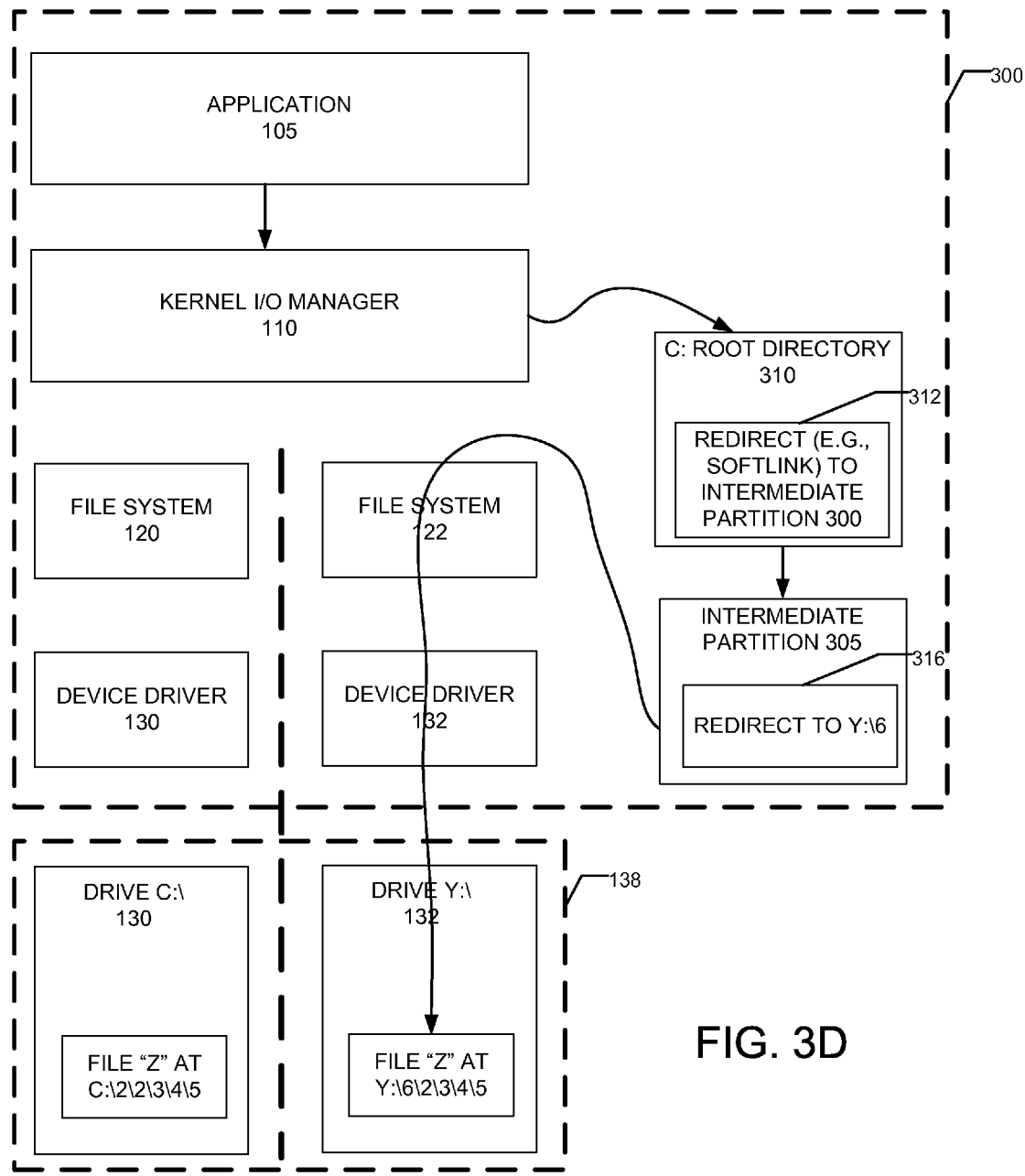
FIG. 3D illustrates the kernel I/O manager using the root directory and the intermediate partition to resolve the path to file "Z" on drive Y:.

FIG. 3C illustrates the copying of file "Z" to drive Y:, and the change to the intermediate partition 305 to reflect the copying of file "Z" to drive Y:. As discussed above, the monitoring application 230 may determine to copy a file to another part of the system, such as drive Y:. In response to the copying of file "Z" to drive Y:, the intermediate partition 305 is modified. In particular, the redirect in the intermediate partition 305 is changed from pointing to C:\2 to pointing to Y:\6. As discussed above, the movement of a file (such as the copying of file "Z" to drive Y:) does not necessitate a change in root directory 310.

FIG. 3D illustrates the kernel I/O manager 110 using the root directory 310 and the intermediate partition 305 to resolve the path to file "Z" on drive Y:. In the example of a request that includes a string in the form of C:\1\2\3\4\52, the kernel I/O manager 110 reads the C:\1 in the string and accesses the root directory 310 in the C: drive to resolve the path to file "Z". Because the root directory 310 has been modified with a redirect, the kernel manager changes the path of the string to X:\7, which is pointing to the intermediate partition. Using the modified string, the kernel I/O manager 110 communicates with intermediate partition 305, which includes another redirect to a part on the Y: drive (in this instance Y:\6 that includes the copy) so that the kernel I/O manager 110 finally resolves the path to file "Z" on the Y: drive. So that, even though file "Z" was moved to the Y: drive, the kernel I/O manager, using the additional redirect to the intermediate partition 305 that includes the path to the copied file "Z", may still resolve the path.

In this way, FIGS. 3A-D illustrate the use of the intermediate partition 305, in which key application directories are routed through the intermediate partition 305 using links which point to other links, pointing back to a persistent storage medium appropriate to the type of data being used. The monitor application 230 thus examines how the data is being used and rewrites the links in the intermediate partition 305 to transparently move data between the partitions without affecting the calling application.

Illustration 1:

The following is an illustration using the monitoring application 230 for the Android operating system. In the Android operating system, the /data/data directory is used to store application-specific content. Each application has its own subdirectory, which is typically further divided into subdirectories, each with its own content characteristics. The web browser application for the Android operating system has the following directory structure:

```
root@android:/data/data/com.google.android.browser # ls -l
drwxrwx--x app_57    app_57    2012-02-01 15:14 app_appcache
drwxrwx--x app_57    app_57    2012-02-01 15:14 app_databases
drwxrwx--x app_57    app_57    2012-02-01 15:14 app_geolocation
drwxrwx--x app_57    app_57    2012-02-01 15:15 app_icons
drwxrwx--x app_57    app_57    2012-02-01 15:15 cache
drwxrwx--x app_57    app_57    2012-02-01 15:15 databases
drwxr-xr-x system    system    2011-11-29 12:16 lib
drwxrwx--x app_57    app_57    2012-02-01 15:14 shared_prefs
```

Some of the above directories, such as cache and databases, may benefit from moving to a different physical partition. For example, the cache directory may be moved to a different partition, leaving a symbolic link behind. The directory structure now looks as follows:

```
root@android:/data/data/com.google.android.browser # ls -l
drwxrwx--x app_57    app_57    2012-02-01 15:14 app_appcache
drwxrwx--x app_57    app_57    2012-02-01 15:14 app_databases
drwxrwx--x app_57    app_57    2012-02-01 15:15 app_geolocation
drwxrwx--x app_57    app_57    2012-02-01 15:15 app_icons
lrwxrwx-x app_57     app_57    2012-02-01 15:21 cache ->
/intermediate/cache
drwxrwx--x app_57    app_57    2012-02-01 15:15 databases
drwxr-xr-x system    system    2011-11-29 12:16 lib
drwxrwx--x app_57    app_57    2012-02-01 15:14 shared_prefs
```

The /intermediate directory in the intermediate partition 305 has the following content:

```
root@android:/intermediate # ls -l
lrwxrwx--x app_57             app_57    2012-02-01 15:21 cache ->
/cache/browsercache/cache
```

The link in the /intermediate directory may be rewritten to point to any other location (in this case pointing to the /cache physical partition of the device). In this way, the /intermediate directory may be used to point to the location where the data has been moved.

Illustration 2:

The following is another illustration using the monitoring application 230 for playback of a movie or other type of video. Movies typically require a huge storage capacity. Depending on the storage configuration, the movie may be composed of a grouping of small files, each of the small files including a section of the movie, with the grouping of small files configured for execution in a sequence. In operation, the calling application calls the next small file in anticipation of playing the section of the movie associated with the called file. Examples of this include, but are not limited to, Dynamic Adaptive Streaming over HTTP (DASH), and Apple's HTTP Live Streaming (HLS). More specifically, DASH enables high quality streaming of media content over the Internet delivered from conventional HTTP web servers. DASH works by breaking the content into a sequence of small HTTP-based file segments, each segment containing a short interval of playback time of a content that is potentially many hours in duration, such as a movie or the live broadcast of a sports event. The content is made available at a variety of different bit rates, i.e., alternative segments encoded at different bit rates covering aligned short intervals of play back time are made available. As the content is played back by a DASH client, the client automatically selects from the alternatives the next segment to download and play back based on current network conditions.

Further, because movies require a huge storage capacity, movies are typically stored on a large storage device (which may be on the order of Terabytes in storage capacity) that is remote and separate from the digital playback device. So that, the movie files may be played on a different device, such as a laptop (or other digital player) with much smaller storage capacity. In operation, the digital player may access a listing of movie files that are available for play. The user, via the digital player, may select one of the movie files for play. The monitoring application 230 may monitor the play of the selected movie file stored in the large storage device. Further, the monitoring application 230 may copy the files that are yet to be played in the selected movie to a quicker storage device (such as the memory associated with the digital player). The monitoring application 230 may also store the location of the copy of the files in the intermediate partition 305 (e.g., a softlink that points to the memory associated with the digital player). So that, when the kernel I/O manager accesses files for the selected movie, the kernel I/O manager will be redirected to the memory associated with the digital player.

In addition to operational changes, the monitoring application 230 may modify the organization of files that are presented to the user. In the movie files example discussed above, some of the movies may be stored on the large and slow storage device, and other movies may be stored on a faster, smaller storage device (such as the local digital player). The monitoring application 230 may further be configured to show to the user (such as in a directory listing) all of the movie files that are stored on the various devices in the system (such as the large and slow storage and the local digital player) as being stored on a single drive (such as the drive associated with the local digital player). In this way, the monitoring application may present to the user a directory listing for a single drive of all of a particular type of file (such as movie files), even though the files are located on different drives.

Figure 4:
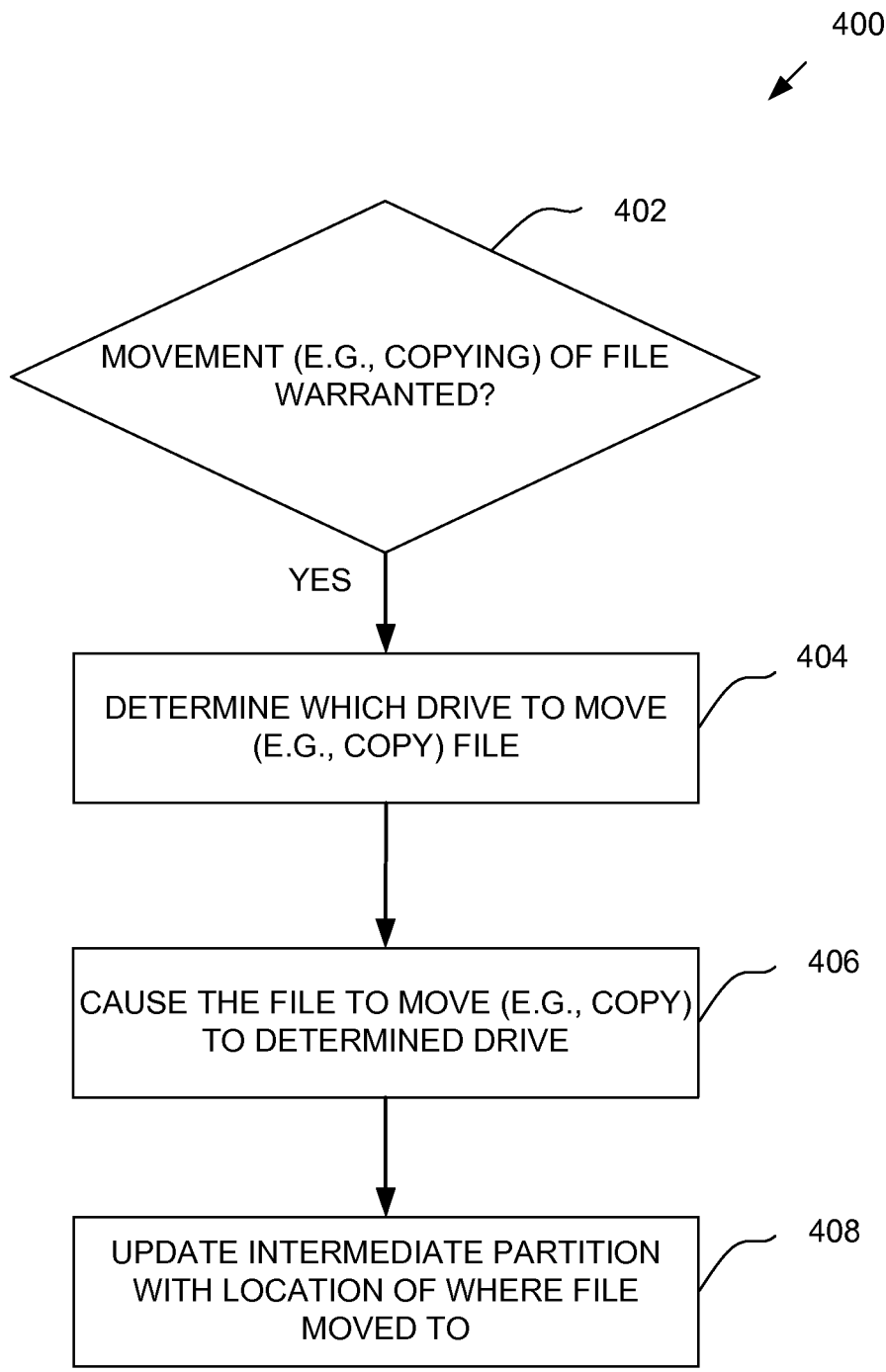
FIG. 4 is a flow chart of the monitoring application determining whether to move a file and in response thereto, updating the intermediate partition to reflect the moving of the file.

FIG. 4 is a flow chart 400 of the monitoring application 230 determining whether to move a file and in response thereto, updating the intermediate partition to reflect the moving of the file. At 402, the monitoring application 230 determines whether movement (such as copying) of a file is warranted. This determination may be based on the use of the file and/or on the characteristic(s) of the drive on which the file is stored.

For example, the monitoring application 230 may monitor which file(s) have been accessed in order to determine whether the same file(s) will be accessed. In response to determining that the same file(s) will be accessed, the monitoring application 230 may determine to move a file. As another example, the monitoring application 230 may anticipate future use of a file (or a series of files), and based on the anticipated use, move the file (or the series of files). The anticipated future use may be based on analyzing past use. For example, in illustration 2 above, a series of files are associated with one another and configured to be executed in sequence. In the event that one of the files in the series of files is accessed, the monitoring application 230 may determine that later files in the sequence will be accessed, and in anticipation, copy the later files in the sequence.

At 404, the monitoring application 230 determines which drive to copy the file. As shown in FIG. 4, the determination whether to move the file and where to move the file are shown as separate steps. Alternatively, the decision whether to move the file and where to move the file may be made in a single step. At 406, in response to determining to copy the file to another drive, the monitoring application causes the file to be moved (e.g., copied) to the determined drive. The monitoring application may cause the file to be copied in one of several ways, such as by instructing another device to perform the copying of the file to the determined drive, or performing the copying to the determined drive by the monitoring application itself. Further, at 408, the intermediate partition is updated with information as to the location of where the file has been copied.

Figure 5:
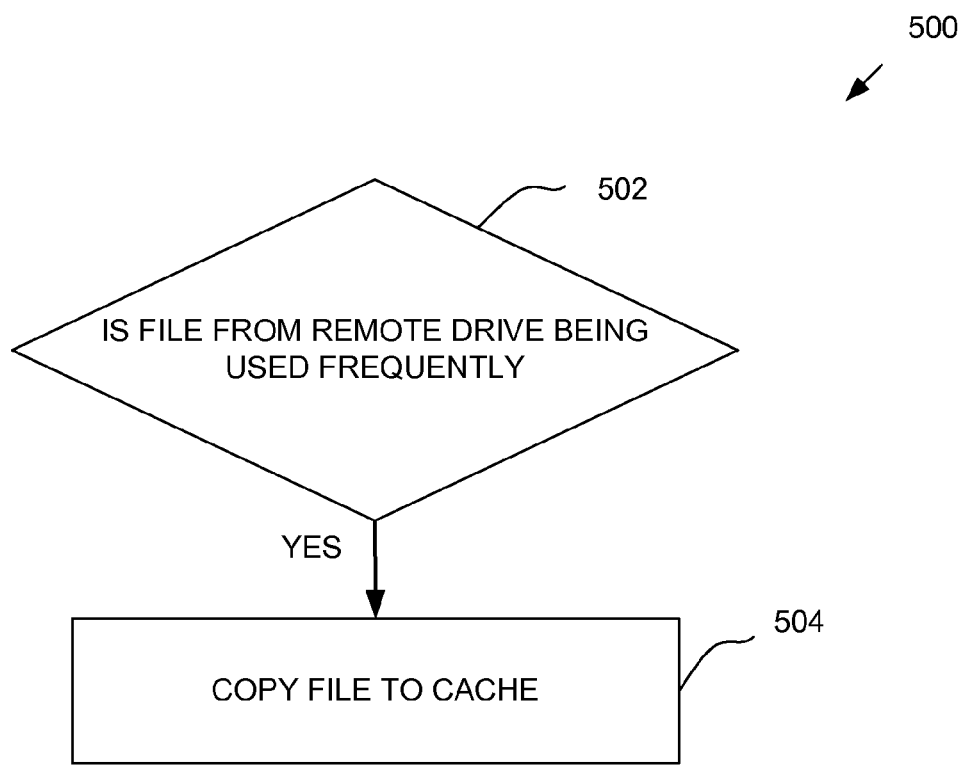
FIG. 5 is a flow chart of the monitoring application determining the frequency of use of a file on a remote drive and in response thereto, copying the file to cache.

FIG. 5 is a flow chart 500 of the monitoring application 230 determining the frequency of use of a file on a remote drive and in response thereto, copying the file to cache. At 520, the monitoring application 230 determines whether the file from a remote drive is being frequently used. The monitoring application 230 may define frequently as a predefined number of accesses within a predefined period. In response to determining that a file is being frequently used, at 504, the file is copied to cache. Thus, the monitoring application 230 may, for example, elect to move a cache directory from one partition to another based on capacity management. Since this is done through an intermediate link, the application is unaware of the change and does not require any signaling in order to use the new location. In this way, the monitoring application enables flexible and scalable changes of directory structures to take advantage of variable-performance partitions, and allows targeting of the right data to the right location in real-time, without modifying host applications.

Figure 6:
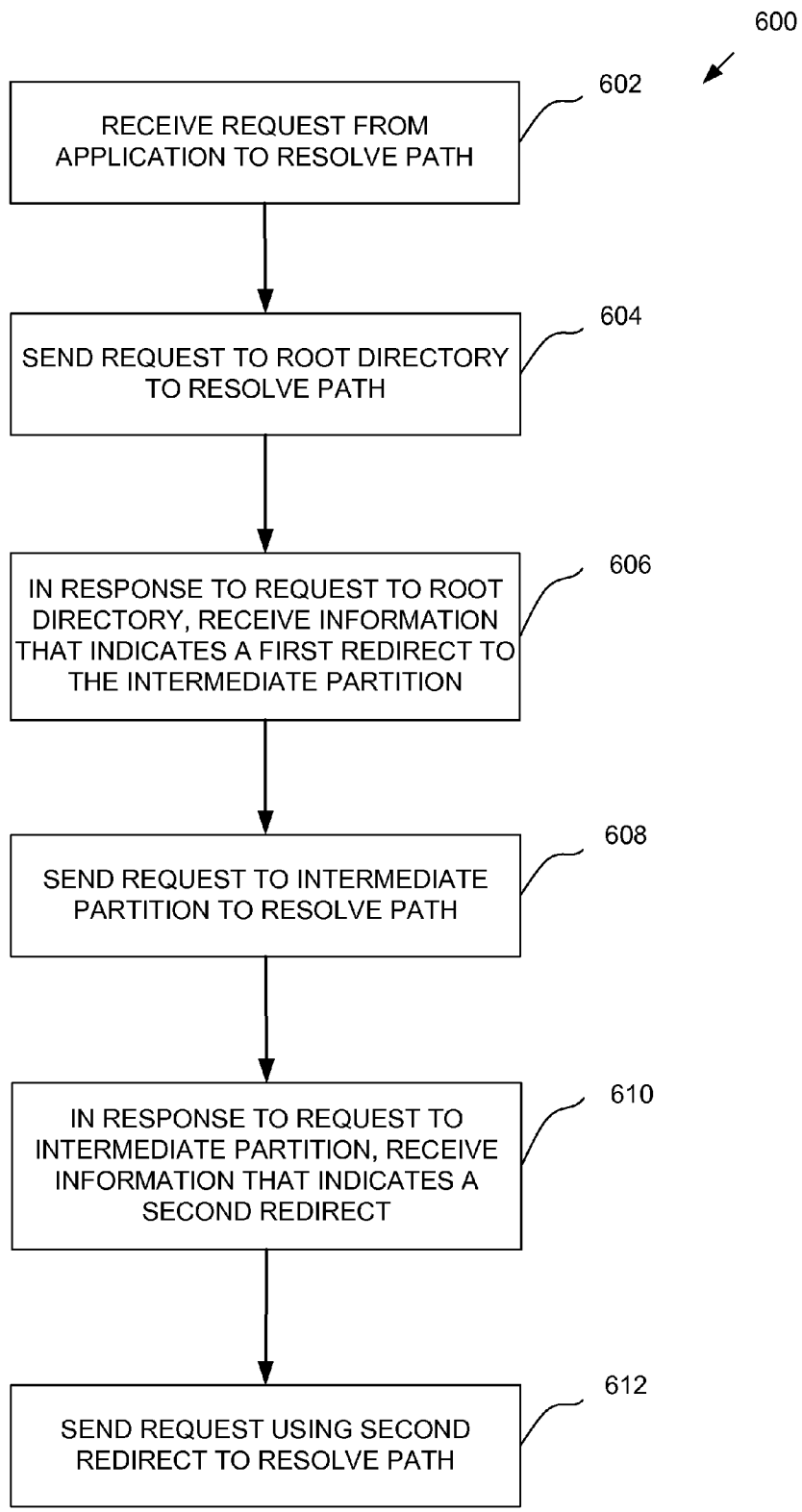
FIG. 6 is a flow chart of the kernel I/O manager resolving the path of a file using the root directory and the intermediate partition.

FIG. 6 is a flow chart 600 of the kernel I/O manager 110 resolving the path of a file using the root directory 310 and the intermediate partition 305. At 602, the kernel I/O manager 110 receives a request from the application 105 to resolve the path to a file. In response to receipt of the request from the application 105, at 604, the kernel I/O manager 110 sends a request to the file system driver that owns the root directory of the drive as indicated in the request from the application. Because of the previous modification of the root directory, at 606, the kernel I/O manager 110 receives information from the root directory indicating a redirect to the intermediate partition 305. At 608, the kernel I/O manager 110 accesses the intermediate partition 305 to resolve the path to the file. For example, the kernel I/O manager 110 may send a request to a file system driver that owns the intermediate partition 305 in order to access the intermediate partition 305. As discussed above, the intermediate partition 305 may include a second redirect. At 610, in response to the request to the intermediate partition 305, the kernel I/O manager 110 receives the second redirect. At 612, the kernel I/O manager 110 uses the second redirect in order to resolve the path to the requested file.

Figure 7:
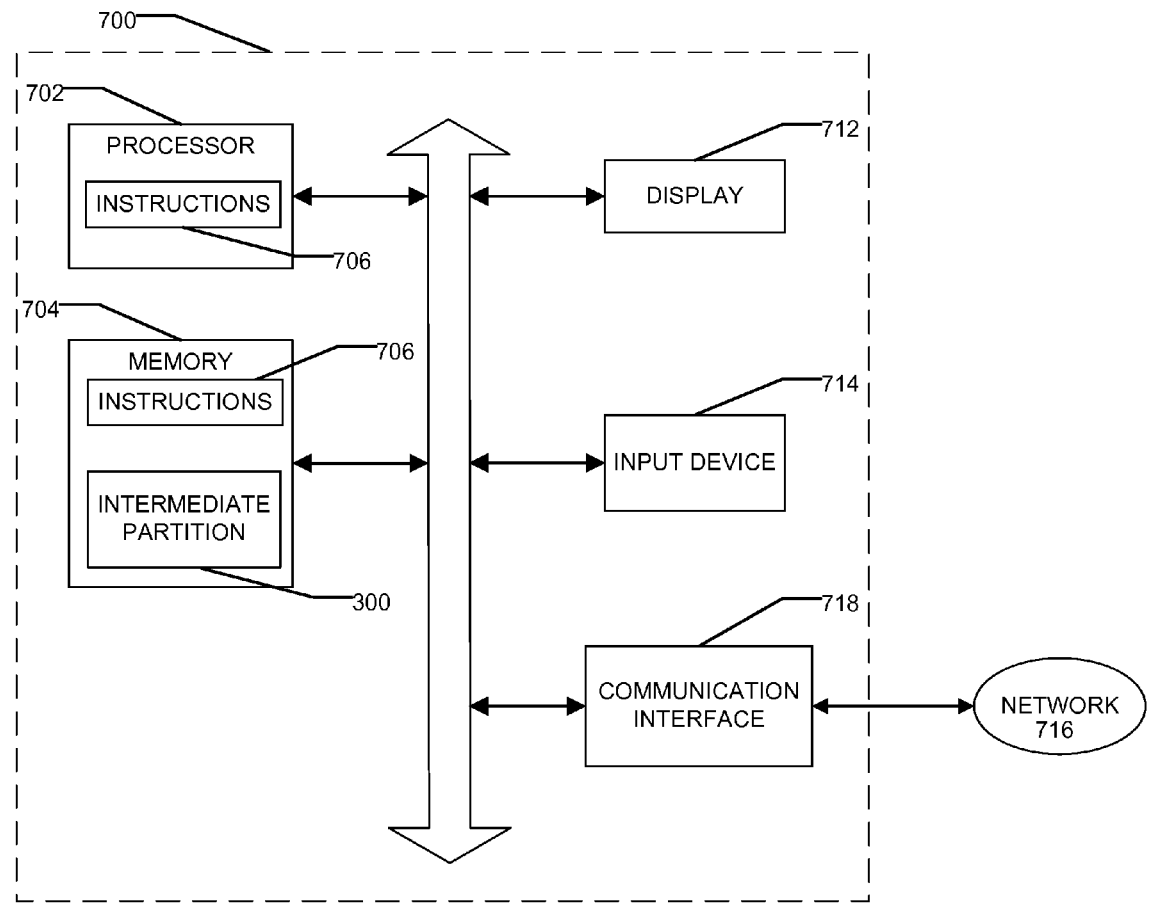
FIG. 7 is a general computer system, programmable to be a specific computer system, which may represent any of the computing devices referenced herein, such as the monitoring application or the kernel I/O manager.

FIG. 7 is a general computer system 700, programmable to be a specific computer system, which may represent any of the computing devices referenced herein, such as, but not limited to, the monitoring application or the kernel I/O manager. The monitoring application and/or the kernel I/O manager may be deployed in a general computer system used in a networked deployment. The computer system 700 may operate in the capacity of a server or as a client user computer in a server-client user network environment, or as a peer computer system in a peer-to-peer (or distributed) network environment. The computer system 700 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 may be implemented using electronic devices that provide voice, video or data communication. Further, while a single computer system may be illustrated, the term "system" shall also be taken to include any collection of systems or sub-systems that individually or jointly execute a set, or multiple sets, of instructions to perform one or more computer functions.

The computer system 700 may include a processor 702, such as, a central processing unit (CPU), a graphics processing unit (GPU), or both. The processor may be a component in a variety of systems. For example, the processor may be part of a standard personal computer or a workstation. The processor may be one or more general processors, digital signal processors, application specific integrated circuits, field programmable gate arrays, servers, networks, digital circuits, analog circuits, combinations thereof, or other now known or later developed devices for analyzing and processing data. The processors and memories discussed herein, as well as the claims below, may be embodied in and implemented in one or multiple physical chips or circuit combinations. The processor may execute a software program, such as code generated manually (i.e., programmed).

The computer system 700 may include a memory 704 that can communicate via a bus. The memory may be a main memory, a static memory, or a dynamic memory. The memory may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory may include a cache or random access memory for the processor. Alternatively or in addition, the memory may be separate from the processor, such as a cache memory of a processor, the memory, or other memory. The memory may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory may be operable to store instructions 706 executable by the processor. The functions, acts or tasks illustrated in the figures or described herein, such as FIGS. 3A-D and 4-6, may be performed by the programmed processor executing the instructions stored in the memory. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 700 may further include a display 712, such as a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor, or specifically as an interface with the software stored in the memory 704.

When the computer system 700 comprises the monitoring application, the memory 704 includes the intermediate partition 305. Though a single memory is illustrated in FIG. 7, the intermediate partition 305 may be stored in a memory separate from the memory storing the instructions 706 configured to perform the functionality of the monitoring application discussed herein.

Additionally, the computer system 700 may include an input device 714 configured to allow a user to interact with any of the components of system. The input device may be a number pad, a keyboard, or a cursor control device, such as a mouse, or a joystick, touch screen display, remote control or any other device operative to interact with the system.

The computer system 700 may also include a disk or optical drive unit. The disk drive unit may include a computer-readable medium in which one or more sets of instructions, e.g. software, may be embedded. Further, the instructions may perform one or more of the methods or logic as described herein. The instructions may reside completely, or at least partially, within the memory 704 and/or within the processor 702 during execution by the computer system 700. The memory 704 and the processor 702 also may include computer-readable media as discussed above.

The present disclosure contemplates a computer-readable medium that includes instructions or receives and executes instructions responsive to a propagated signal, so that a device connected to a network 716 may communicate voice, video, audio, images or any other data over the network. Further, the instructions may be transmitted or received over the network via a communication interface 718. The communication interface may be a part of the processor or may be a separate component. The communication interface may be created in software or may be a physical connection in hardware. The communication interface may be configured to connect with a network, external media, the display, or any other components in system, or combinations thereof. The connection with the network may be a physical connection, such as a wired Ethernet connection or may be established wirelessly as discussed below. Likewise, the additional connections with other components of the system may be physical connections or may be established wirelessly. In the case of a service provider server, the service provider server may communicate with users through the communication interface.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The computer-readable medium may be a single medium, or the computer-readable medium may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system 700 to perform any one or more of the methods or operations disclosed herein.

The computer-readable medium may include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. The computer-readable medium is preferably a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. A method of selectively routing a file system object transparently to an operating system, the method comprising:
    performing by a processor configured to carry out selective routing under control of a monitoring application which is operable with an operating system and includes an intermediate partition with redirect information, wherein the processor has operable connections to first and second memory devices for such selective routing:
        determining whether to route a file system object from the first memory device to the second memory device;
        in response to determining to route the file system object:
            causing the file system object to be routed to a location in the second memory device; and
            updating the intermediate partition's redirect information for the file system object with the location of the file system object in the second memory device,
        causing a directory of the first memory device to redirect to the intermediate partition, the directory for the operating system to resolve paths for file system objects stored in the first memory device,
    wherein, prior to routing the file system object from the first memory device to the second memory device, the operating system uses the directory in the first memory device to resolve the path to the file system object stored in the first memory device,
    wherein, after routing the file system object from the first memory device to the second memory device, the operating system uses the directory in the first memory device to resolve the path to the file system object stored in the second memory device and is redirected to the intermediate partition, and
    wherein, after being redirected to the intermediate partition and using the intermediate partition's redirect information, the operating system resolves the path to the file system object stored in the second memory device so that the operating system uses the directory in the first memory device prior to and after the routing of the file system object to the second memory device such that the routing is transparent to the operating system.

2. The method of claim 1, wherein causing the file system object to be routed to a location in the second memory device comprises causing the file system object to be copied to the location in the second memory device.

3. The method of claim 1, wherein the first memory device and the second memory device differ in one or more aspects.

4. The method of claim 3, wherein the one or more aspects comprise location, speed, size, endurance, or performance.

5. The method of claim 1, wherein the file system object comprises one or more of a plurality of files, the plurality of files configured for execution in a sequence;
wherein determining whether to route the file system object comprises determining whether one of the plurality of files has been accessed for execution; and
wherein routing the file system object comprises copying one or more files in the plurality of files that are later in the sequence than the accessed file for execution.

6. The method of claim 5, wherein the plurality of files comprise a series of files for a movie;
wherein the one of the plurality of files has been accessed by a digital player;
wherein the first memory device is remote from the digital player; and
wherein the second memory device is associated with the digital player.

7. The method of claim 1, wherein the directory comprises a mount point of the first memory device.

8. The method of claim 7, wherein the mount point comprises a root directory of the first memory device.

9. The method of claim 8, wherein the root directory for resolving paths of the file system objects consists of one or more intermediate partition softlinks, each of the one or more intermediate partition softlinks configured to redirect to the intermediate partition.

10. The method of claim 9, wherein the intermediate partition for resolving paths of file system objects consists of softlinks.

11. The method of claim 1, wherein causing the directory of the first memory device to redirect to the intermediate partition is in response to determining to route the file system object.

12. The method of claim 1, wherein causing the directory of the first memory device to redirect to the intermediate partition is performed prior to determining to route the file system object.

13. A method of selectively routing a file system object transparently to an operating system, the method comprising:
performing by a processor configured to carry out selective routing under control of a monitoring application which is operable with an operating system and includes an intermediate partition with redirect information, wherein the processor has operable connections to first and second memory devices for such selective routing:
determining whether to route a file system object from the first memory device to the second memory device;
in response to determining to route the file system object, causing the file system object to be routed to a location in the second memory device; and
updating the intermediate partition's redirect information for the file system object with the location of the file system object in the second memory device,
wherein the first memory device includes a directory for the operating system to resolve paths for file system objects stored in the first memory device,
wherein the directory includes information of a redirect to the intermediate partition,
wherein, using the intermediate partition's redirect information, the operating system continues using the directory in the first memory device to resolve the path to the file system object stored in the second memory device so that the routing of the file system object to the second memory device is transparent to the operating system,
wherein causing the file system object to be routed to a location in the second memory device comprises causing the file system object to be copied to the location in the second memory device,
wherein prior to causing the file system object to be copied to the location in the second memory device:
the file system object is stored in a location in the first memory device;
the directory includes the information of the redirect to the intermediate partition; and
the intermediate partition's redirect information for the file system object comprises the location of the file system object in the first memory device;
wherein the intermediate partition's redirect information of the location of the file system object in the first memory device is used to redirect the operating system to the file system object stored at the location in the first memory device.

14. A monitoring device for selectively routing a file system object transparently to an operating system, the monitoring device comprising:
one or more memories configured to store an intermediate partition, the intermediate partition comprising redirect information; and
a processor in communication with the one or more memories, the processor configured to carry out selective routing under control of the monitoring device which is operable with the operating system, wherein the processor has operable connections to first and second memory devices for such selective routing and configured to:
determine whether to route a file system object from the first memory device to the second memory device;
in response to determining to route the file system object:
cause the file system object to be routed to a location in the second memory device; and
update the intermediate partition's redirect information for the file system object with the location of the file system object in the second memory device,
causing a directory of the first memory device to redirect to the intermediate partition, the directory for the operating system to resolve paths for file system objects stored in the first memory device,
wherein, prior to routing the file system object from the first memory device to the second memory device, the operating system uses the directory in the first memory device to resolve the path to the file system object stored in the first memory device,
wherein, after routing the file system object from the first memory device to the second memory device, the operating system uses the directory in the first memory device to resolve the path to the file system object stored in the second memory device and is redirected to the intermediate partition, and
wherein, after being redirected to the intermediate partition and using the intermediate partition's redirect information, the operating system resolves the path to the file system object stored in the second memory device so that the operating system uses the directory in the first memory device prior to and after the routing of the file system object to the second memory device such that the routing is transparent to the operating system.

15. The monitoring device of claim 14, wherein the processor is configured to cause the file system object to be routed to a location in the second memory device by causing the file system object to be copied to the location in the second memory device.

16. The monitoring device of claim 15, wherein prior to causing the file system object to be copied to the location in the second memory device:

the file system object is stored in a location in the first memory device;

the directory includes the information of the redirect to the intermediate partition; and the intermediate partition's redirect information for the file system object comprises the location of the file system object in the first memory device;

wherein the intermediate partition's redirect information of the location of the file system object in the first memory device is used to redirect the operating system to the file system object stored at the location in the first memory device.

17. The monitoring device of claim 14, wherein the first memory device and the second memory device differ in one or more aspects.

18. The monitoring device of claim 17, wherein the one or more aspects comprise location, speed, size, endurance, or performance.

19. The monitoring device of claim 14, wherein the file system object comprises one or more of a plurality of files, the plurality of files configured for execution in a sequence;

wherein the processor is configured to determine whether to route the file system object by determining whether one of the plurality of files has been accessed for execution; and wherein the processor is configured to route the file system object by copying one or more files in the plurality of files that are later in the sequence than the accessed file for execution.

20. The monitoring device of claim 19, wherein the plurality of files comprise a series of files for a movie;

wherein the one of the plurality of files has been accessed by a digital player;

wherein the first memory device is remote from the digital player; and wherein the second memory device is associated with the digital player.

21. The monitoring device of claim 14, wherein the directory comprises a mount point of the first memory device.

22. The monitoring device of claim 21, wherein the mount point comprises a root directory of the first memory device.

23. The monitoring device of claim 22, wherein the root directory for resolving paths of the file system objects consists of one or more intermediate partition softlinks, each of the one or more intermediate partition softlinks configured to redirect to the intermediate partition.

24. The monitoring device of claim 23, wherein the intermediate partition for resolving paths of file system objects consists of softlinks.

25. The monitoring device of claim 14, wherein the processor is configured to cause the directory of the first memory device to redirect to the intermediate partition in response to determining to route the file system object.

26. The monitoring device of claim 14, wherein the processor is configured to cause the directory of the first memory device to redirect to the intermediate partition prior to determining to route the file system object.

* * * * *